United States Patent
Weiss et al.

(10) Patent No.: US 7,865,412 B1
(45) Date of Patent: Jan. 4, 2011

(54) METHOD AND SYSTEM FOR ACCOUNT TRACKING

(75) Inventors: Benjamin R. Weiss, Portola Valley, CA (US); James R. Del Favero, Redwood City, CA (US); George A. Hansen, Danville, CA (US); Glynis L. Hively, San Jose, CA (US); David R. Larsen, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 843 days.

(21) Appl. No.: 11/809,340

(22) Filed: May 31, 2007

(51) Int. Cl.
*G07B 17/00* (2006.01)
*G07F 19/00* (2006.01)

(52) U.S. Cl. .......................... 705/30; 705/31
(58) Field of Classification Search ............. None
See application file for complete search history.

(56) References Cited

U.S. PATENT DOCUMENTS

| | | | | |
|---|---|---|---|---|
| 5,842,185 | A * | 11/1998 | Chancey et al. | 705/40 |
| 6,507,825 | B2 * | 1/2003 | Suh | 705/30 |
| 6,792,422 | B1 * | 9/2004 | Stride et al. | 1/1 |
| 6,883,708 | B1 * | 4/2005 | Fiedler et al. | 235/380 |
| 2002/0099635 | A1 * | 7/2002 | Guiragosian | 705/35 |
| 2006/0004866 | A1 * | 1/2006 | Lawrence et al. | 707/104.1 |
| 2007/0011175 | A1 * | 1/2007 | Langseth et al. | 707/100 |
| 2007/0129987 | A1 * | 6/2007 | Hauser et al. | 705/9 |
| 2008/0071587 | A1 * | 3/2008 | Granucci et al. | 705/5 |
| 2008/0195438 | A1 * | 8/2008 | Manfredi et al. | 705/7 |
| 2008/0319922 | A1 * | 12/2008 | Lawrence et al. | 705/36 R |

OTHER PUBLICATIONS

"Tracking How Much You Spend and Save"; Software Help Manual for Quicken 2000 Deluxe Program, Intuit, Inc., pp. 1-7, 1999 (7 pages).

* cited by examiner

*Primary Examiner*—F. Zeender
*Assistant Examiner*—Christopher Buchanan
(74) *Attorney, Agent, or Firm*—Osha • Liang LLP

(57) ABSTRACT

A method for account tracking that includes receiving a request to generate a report for a business entity, wherein the request specifies a tag associated with the business entity, identifying a plurality of transaction records based on the tag to obtain a plurality of identified transaction records for the business entity, assigning a business category from a plurality of business categories to at least one of the plurality of identified transaction records not associated with one of the plurality of business categories, and generating the report for the business entity by grouping the plurality of identified transaction records according to the plurality of business categories.

22 Claims, 11 Drawing Sheets

METHOD AND SYSTEM FOR ACCOUNT TRACKING

BACKGROUND

In general, financial accounting applications assist users in tracking financial transactions. The financial transactions typically span multiple financial accounts. For example, a user may have a credit card account, a banking account, a savings account, or another account used to track financial transactions. The financial accounting application typically includes functionality to collate the financial transaction data to generate reports. The users may use the reports, for example, to monitor the status of a user's business or personal finances, create a tax return for submitting to the Internal Revenue Service, and provide information to co-owners and investors.

Often owners of small businesses co-mingle personal and business income and expenses in one or more financial accounts. For example, consider a scenario in which an individual operates a costume jewelry business from their house in order to supplement their regular income. In addition to standard personal income and expenses, the individual may use their personal credit card to purchase the raw goods (e.g., beads, rhinestones, thread, clasps, etc.) for creating the costume jewelry and their personal banking account to deposit income received from selling the costume jewelry. Thus, each financial account of the user may represent both business income and expenses and personal income and expenses.

In order to perform the accounting for the small business when finances are co-mingled, the owner may manually separate the personal and business income and expenses, using the financial accounting application. Once the separation is complete, the owner may perform standard accounting operations to generate reports.

SUMMARY

In general, in one aspect, the invention relates to a method for account tracking that includes receiving a request to generate a report for a business entity, wherein the request specifies a tag associated with the business entity, identifying a plurality of transaction records based on the tag to obtain a plurality of identified transaction records for the business entity, assigning a business category from a plurality of business categories to at least one of the plurality of identified transaction records not associated with one of the plurality of business categories, and generating the report for the business entity by grouping the plurality of identified transaction records according to the plurality of business categories.

In general, in one aspect, the invention relates to a system for account tracking that includes a data repository for maintaining a financial account transaction data, and a financial accounting application configured to receive a request to generate a report for a business entity, wherein the request specifies a tag associated with the business entity, identify a plurality of transaction records based on the tag using the financial account transaction data to obtain a plurality of identified transaction records for the business entity, assign a business category from a plurality of business categories to at least one of the plurality of identified transaction records not associated with one of the plurality of business categories, and generate the report for the business entity by grouping the plurality of identified transaction records according to the plurality of business categories.

In general, in one aspect, the invention relates to a method for account tracking that includes requesting to generate a report for a business entity according to a tag associated with the business entity, wherein a plurality of transaction records are associated with the tag, viewing a prompt to assign a business category from a plurality of business categories to at least one of a plurality of transaction records, wherein the business category is one selected from a group consisting of a transaction record associated with a personal category and a uncategorized transaction record, assigning the business category to the at least one transaction record using the prompt, and reviewing the report, wherein the report is generated for the business entity by grouping the plurality of transaction records according to the plurality of business categories.

In general, in one aspect, the invention relates to a computer readable medium that includes computer readable program code embodied therein for causing a computer system to receiving a request to generate a report for a business entity, wherein the request specifies a tag associated with the business entity, identifying a plurality of transaction records based on the tag to obtain a plurality of identified transaction records for the business entity, assigning a business category from a plurality of business categories to at least one of the plurality of identified transaction records not associated with one of the plurality of business categories, and generating the report for the business entity by grouping the plurality of identified transaction records according to the plurality of business categories.

Other aspects of the invention will be apparent from the following description and the appended claims.

DETAILED DESCRIPTION

Figure 1:
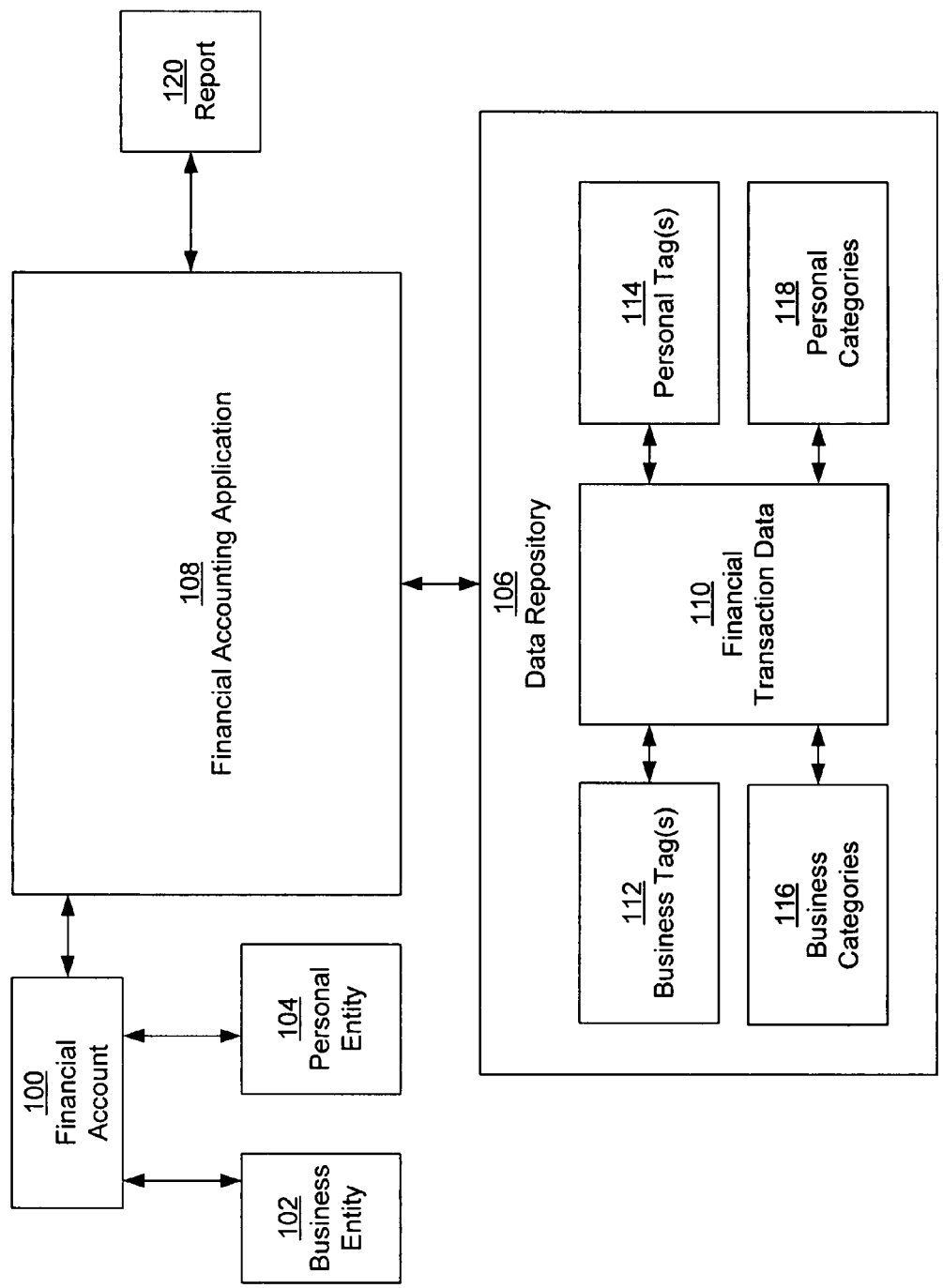
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for account tracking. Specifically, embodiments of the invention use tags to identify the financial transactions performed on behalf of a business and/or financial transactions performed for personal reasons. Further, embodiments of the invention determine whether each of the identified financial transactions is labeled with a tag is assigned (or otherwise associated with) to a business category. In one or more embodiments of the invention, the business categories may be associated with line items of a tax return. Thus, financial transactions which are not assigned to a business category may be identified and assigned to a business category. In one or more embodiments of the invention, a report is generated using the financial transactions and the business categories. Further, because the financial transactions are assigned to business categories, one or more embodiments of the invention may be used to identify the financial transactions which are tax deductible.

FIG. 1 shows a schematic diagram of a system in accordance with one or more embodiments of the invention. As shown in FIG. 1, the system includes a financial account (100), a business entity (102), a personal entity (104), a data repository (106), and a financial accounting application (108) in accordance with one or more embodiments of the invention. Each of these components is described below.

In one or more embodiments of the invention, a financial account (100) is an account used to track and/or store financial transactions. For example, a financial account (100) may be a mortgage account, a banking account, a loan account, a credit card account, etc. The financial transactions may be transactions for purchasing or selling goods or services, such as income, rent, groceries, and fuel. Each financial transaction may be performed on behalf of a business entity (102), a personal entity (104), or both.

In one or more embodiments of the invention, a business entity (102) is any type of business, such as a sole proprietorship, partnership, company, non-profit organization, or any other entity established to conduct business. A personal entity (104) is an individual or group of related individuals, such as a family. In one or more embodiments of the invention, the individual who performs financial transactions for the business entity (102) is a part of the personal entity (104). For example, the individual may be a person operating a clothing business and is a part of a family. Further, in one or more embodiments of the invention, the person may use the same financial account (100) or group of financial accounts for the financial transactions for the business entity (102) and the personal entity (104). In the previous example, the person may purchase cloth and a sewing machine for the clothing business and groceries for the family using the same financial account.

In one or more embodiments of the invention, data corresponding to and/or associated with the financial transactions may be stored in a data repository (106). In one or more embodiments of the invention, the data repository (106) is a storage unit, such as a file, file system, database, or other system for storing data, for data. The data repository (106) may be local or remote to the computer executing the financial accounting application. Further, the data in the data repository (106) may include a business tag (112), a personal tag (114), business categories (116), personal categories (118), and financial transaction data (110).

In one or more embodiments of the invention, the business tag (112) is an identifier of the business entity (102). For example, the business tag (112) may include the name of the business entity (102) or other information used to identify the business entity (102). In one or more embodiments of the invention, the data repository (106) maintains a list of business tags which may be associated with financial transactions. In one or more embodiments of the invention, each business tag (112) in the list of business tags may be defined by the user of the financial accounting application (108) (described below). For example, a user may define the following business tags: "candle shop" and "rental properties."

In one or more embodiments of the invention, the personal tag (114) specifies a personal entity (104). Examples of personal tags include, but are not limited to, "Smith family" and "Bob Smith." In one or more embodiments of the invention, the data repository (106) may maintain a list of personal tags specified by the user of the financial accounting application (108).

In one or more embodiments of the invention, the tags (i.e., business tag (112), personal tag (114)) not only identify the business entity (102) or personal entity (104), but also have a property which specifies whether the tag is a business tag or a personal tag. In one or more embodiments of the invention, a financial account (100) is associated with a default tag, which may be a business tag or a personal tag. Thus, when financial transaction data (110) (described below) is obtained from the financial account (100), the appropriate business tag (112) or personal tag (114) is associated with the financial transaction data corresponding to the default tag.

Continuing with FIG. 1, in one or more embodiments of the invention, business categories (116) is a list of possible business categories that may be associated with each of the financial transactions. In one or more embodiments of the invention, each business category specifies a business-related reason for the transaction, such as raw goods, services for a business, gifts for clients, fuel for work related trips, or any other business-related reasons for the transaction. In one or more embodiments of the invention, the business categories (116) may be defined by the user and/or may be defined by a financial accounting application (108). In one or more embodiments of the invention, each business category is associated with a tax line item obtained from a tax document. Thus, when a financial transaction is assigned a business tag (112) but not a business category (116), then the financial transaction may be identified as being potentially tax deductible.

In one or more embodiments of the invention, personal categories (118) are a list of possible personal categories, which may be associated with personal transactions. In one or more embodiments of the invention, each personal category specifies a personal reason for performing the financial transaction, such as personal gifts to family members, groceries, home mortgage payment, or any other personal reason for performing the transaction. The personal categories may or may not be associated with a tax line item on a tax return.

Figure 2:
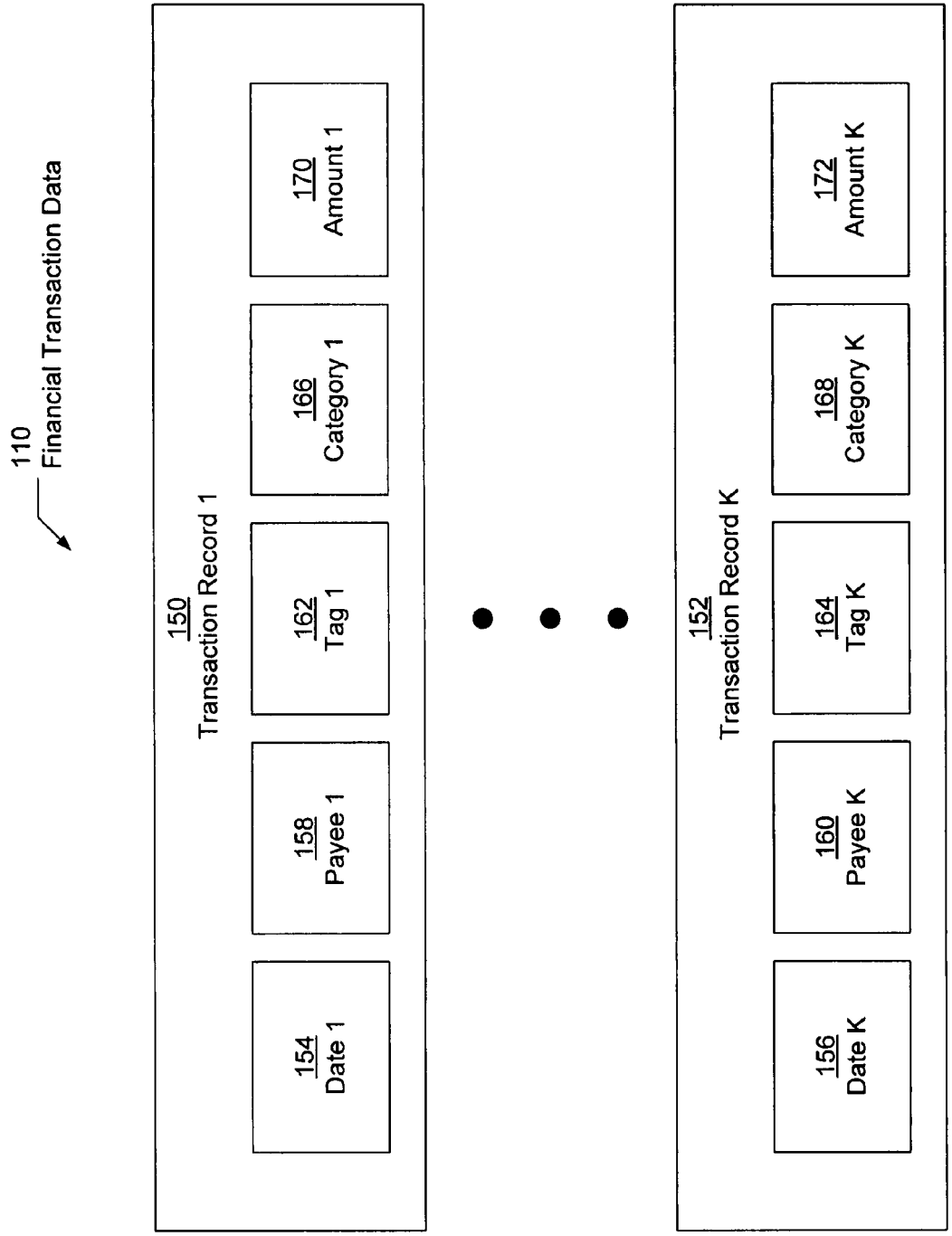
FIG. 2 shows financial account transaction data in accordance with one or more embodiments of the invention.

In one or more embodiments of the invention, financial transaction data (110) is data maintained by the data repository (106) for each of the financial transactions performed using the financial account (100). FIG. 2 shows financial transaction data (110) in accordance with one or more embodiments of the invention. As shown in FIG. 2, the financial transaction data (110) is a collection of transaction records (e.g., transaction record 1 (150), transaction record k (152)). Each transaction record (e.g., transaction record 1 (150), transaction record k (152)) maintains data for a financial transaction performed with the financial account (e.g., financial account (100) in FIG. 1) in one or more embodiments of the invention. In particular, each transaction record (e.g., transaction record 1 (150), transaction record k (152)) includes a date (e.g., date 1 (154), date k (156)), a payee (e.g., payee 1 (158), payee k (160)), a tag (e.g., tag 1 (162), tag k (164)), a category (e.g., category 1 (166), category k (168)), and an amount (e.g., amount 1 (170), amount k (172)) for the financial transaction in one or more embodiments of the invention.

The date (e.g., date 1 (154), date k (156)) identifies the date of the transaction. The date of the transaction may be the date on which the transaction was performed or a date on which the transaction is posted to the financial account. In one or more embodiments of the invention, the amount (e.g., amount 1 (170), amount k (172)) specifies the amount of currency credited or debited to the financial account.

In one or more embodiments of the invention, the payee (e.g., payee 1 (158), payee k (160)) may identify the entity with which the financial transaction is performed. The financial transaction with the payee may cause a debit or credit to the financial account. For example, if an individual buys goods from or sells goods to a store for a business entity, then the payee is the store. Accordingly, the payee (e.g., payee 1 (158), payee k (160)) may specify a store, a company, individual, or any other entity which is able to take part in a financial transaction.

In one or more embodiments of the invention, the tag (e.g., tag 1 (162), tag k (164)) specifies the business entity (e.g., business entity (102) in FIG. 1) or the personal entity (e.g., personal entity (104) in FIG. 1) on behalf of which the financial transaction. Further, in one or more embodiments of the invention, multiple tags (e.g., tag 1 (162), tag k (164)) may be in the same transaction record (e.g., transaction record 1 (150), transaction record k (152)). For example, if the financial transaction is performed on behalf of two different business entities controlled by the same individual, then a tag for each of the business entities may be stored in the transaction record.

In one or more embodiments of the invention, a category (e.g., category 1 (166), category k (168)) specifies a business and/or personal reason for a transaction. As discussed above, the category may be a business category (i.e., business categories (116) in FIG. 1) or a personal category (i.e., personal categories (118) in FIG. 1). In one or more embodiments of the invention, a transaction record (e.g., transaction record 1 (150), transaction record k (152)) may be uncategorized. For example, the category field in the transaction record may be empty.

Further, in one or more embodiments of the invention, a transaction record (e.g., transaction record 1 (150), transaction record k (152)) may be subdivided. For example, if an individual purchases goods from the same store in a single transaction is performed on behalf of a sole proprietorship as well as a family, then the individual may specify a subdivision of the transaction record. In such scenarios, each subdivision may have a separate tag and/or category.

Returning to FIG. 1, the data repository (106) is connected to a financial accounting application (108) in accordance with one or more embodiments of the invention. Specifically, the financial accounting application (108) includes functionality to access the data repository (106). Portions of or the entire data repository (106) may be local or remote to the computer system upon which the financial accounting application (108) is executing. Similarly, portions of or all of the financial accounting application (108) may execute locally or remotely. In one or more embodiments of the invention, the financial accounting application (108) includes functionality to populate and access the data repository (106) and generate a report (120).

In one or more embodiments of the invention, the financial accounting application (108) includes functionality to associate business categories with tax line items. Moreover, in one or more embodiments of the invention, the financial accounting application (108) includes functionality to identify business transactions from the tag associated with each transaction record in the financial transaction data and determine whether the business transactions are all associated with business categories (116). When the financial accounting application (108) identifies a transaction record not associated with a business category, the financial accounting application includes functionality to inform the user in one or more embodiments of the invention.

In one or more embodiments of the invention, the report (120) generated by the financial accounting application (108) may be any type of report including information about a business entity. The report may be a periodic report, such as a monthly, quarterly, or annual report, or may be generated on demand. For example, the report (120) may be an expense report, a balance sheet, or a tax return. Further, in one or more embodiments of the invention, the report (120) is interactive. Specifically, a user may select specific items in the report (120) and obtain additional information about these items. For example, the report may have a chart representing expenses divided into categories. In such scenario, the user may select the chart to see a list of each financial transaction used to calculate the expense. In one or more embodiments of the invention, the report (120) shows a total amount of tax deductible expenses and a total amount of potentially tax deductible expenses. In one or more embodiments of the invention, the tax deductible expenses correspond to the total amount spent in financial transactions which have a business tag and a business category associated with a tax line item for tax deductible expenses. In one or more embodiments of the invention, potentially tax deductible expenses correspond to the total amount spent in financial transactions which have a business tag and are uncategorized or only have a personal category. When a user selects the potentially tax deductible expenses, a prompt may be displayed which allows the user to re-categorize uncategorized or personally categorized financial transactions with business categories.

The following is an example of how the data repository (106 in FIG. 1) may be populated with financial transaction data for one or more financial accounts in accordance with one or more embodiments of the invention. In general, one or more individuals, such as family members or owners of a business, may perform a variety of financial transactions for a personal entity or a business entity using the financial account(s). Subsequently, each financial account may include a mix of financial transactions associated with one or more business entities and financial transactions associated with one or more personal entities.

Continuing with the example, using the financial accounting application, the user may create tags for each business entity and personal entity as well as create business categories and personal categories. Further, the user may store information about each financial account, such as the name of account, whether the account is primarily for a business entity or a personal entity, type of account, the default tag to associate with each for financial transaction in a given financial account.

Continuing with the example, the user may populate the data repository with data from the financial account(s). The user may populate the data repository manually or by requesting that the financial accounting application provide the information. As the financial account data is populated in the data repository, each transaction record may be associated with a default tag, if one exists. Alternatively, when a default tag does not exist, each transaction record may be stored in the data repository without a tag. The user may assign a business tag or a personal tag to each of the transaction records. Further, the user may assign one or more categories (business or personal) to the transactions record. At any time, the user may request the generation of a report.

Figure 3:
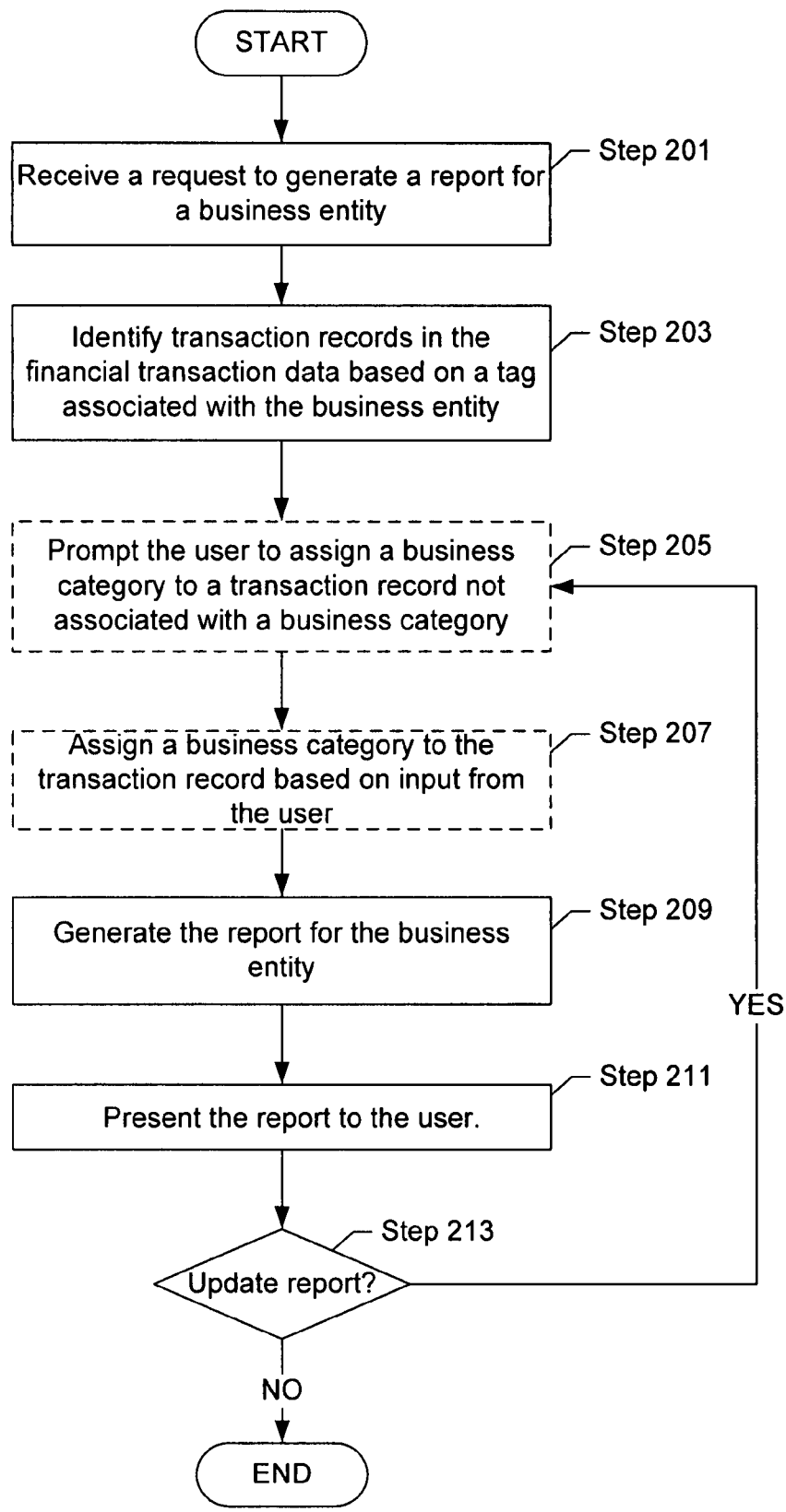
FIGS. 3-4 show flowcharts of a method in accordance with one or more embodiments of the invention.
Figure 4:
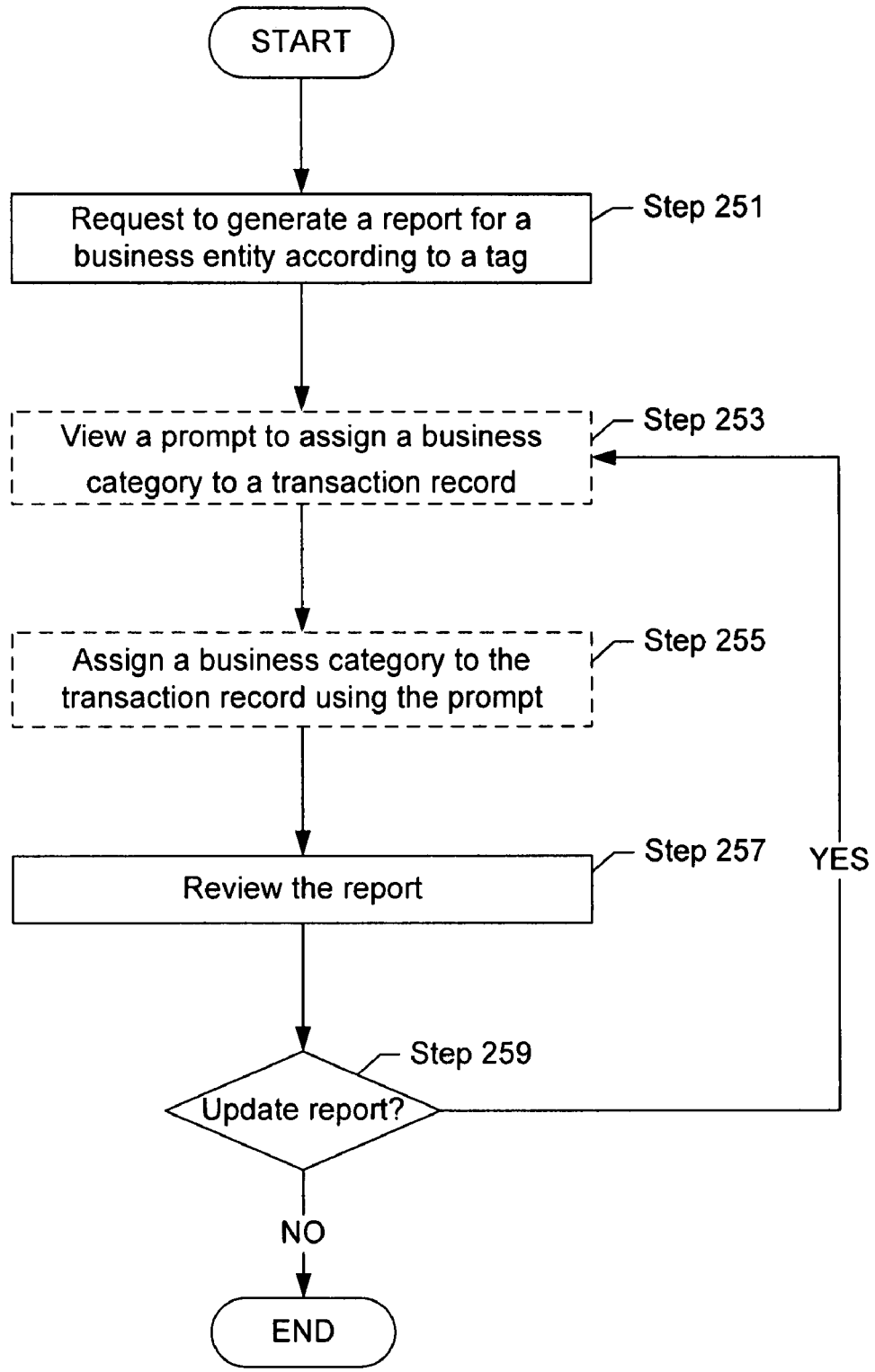

FIGS. 3-4 show flowcharts of a method in accordance with one or more embodiments of the invention. While the various steps in these flowcharts are presented and described sequentially, one of ordinary skill will appreciate that some or all of the steps may be executed in different orders and some or all of the steps may be executed in parallel.

FIG. 3 shows a flowchart of a method for generating a report using a financial accounting application in accordance with one or more embodiments of the invention. Initially, the financial accounting application receives a request to generate a report for a business entity (Step 201). The request may be for generating periodic reports or for generating a report immediately. The financial accounting application may receive the request via a user interface of the financial accounting application. For example, a user may use the user interface to request the continual generation of a quarterly report. When the time frame for the report has elapsed, such as at the end of the quarter or immediately, the financial accounting application begins generating the report in accordance with one or more embodiments of the invention.

Specifically, the financial accounting application identifies transaction records in the financial transaction data based on a business tag associated with the business entity (Step 203). The transaction records may be obtained from multiple financial accounts in accordance with one or more embodiments of the invention. Thus, the financial accounting application may query multiple financial accounts, both business and personal, for transaction records having the business tag. The business tag may be specified as part of the request or derived from the request. For example, the user may specify the business entity and the financial accounting application may identify which business tag(s) are associated with the business entity. When the request specifies a timeframe for the dates in the transaction records or other such parameters, the financial accounting application may identify the transaction records satisfying the parameters.

Further, after or while identifying the transactions records having the business tag(s), the financial accounting application may identify the transaction records not currently assigned to (or otherwise associated with) a business category. Specifically, for each transaction record having a business tag, the financial accounting application may determine whether the transaction record is assigned to a business category in accordance with one or more embodiments of the invention. If the transaction record is not assigned to a business category, then the financial accounting application may add the transaction record to a list of transaction records.

At this stage, the financial accounting application may prompt the user to assign a business category to each transaction record (i.e., the transaction records in the aforementioned list) not currently assigned (or otherwise associated with) a business category in accordance with one or more embodiments of the invention (Step 205). For example, the financial accounting application may display a dialog box by which the user may select a business category. For example, the dialog box may have an identifier of the transaction record, such as name, date, and/or other information that may be used to identify the transaction record, and field for the user to select (or otherwise provide) the business category, such as a drop-down box, checkboxes, text box, or any other input or selection function. Further, the financial accounting application may also include in the dialog box a field for submitting a tax line item to assign (or otherwise associate) to the transaction record.

After prompting the user, input from the user specifies business categories to be assigned to the transaction records. Accordingly, the financial accounting application assigns a business category to the record transaction based on the input from the user (Step 207). Specifically, the financial accounting application may update the transaction record to include business category.

Alternatively, the user may be prompted and the business category assigned after generation of the report in accordance with one or more embodiments of the invention. For example, the report may specify that transaction records exist, which are not assigned to business categories in accordance with one or more embodiments of the invention. Thus, the financial accounting application may prompt the user when the user selects a link in the report to assign (or otherwise associate) enable the user to assign a business category to each of transaction records listed in the report as not currently being associated with a business category.

Continuing with FIG. 3, the financial accounting application generates the report for the business entity by grouping the transaction records for the business entity (Step 209). The procedure for generating the report may be specific to the type of report. For example, one method for generating the report may be to aggregate the amounts of each transaction record according to business categories. For example, if the business requires travel by car, then the report may aggregate the amounts associated in the transaction records having the business-fuel category. Alternatively, the amounts may be aggregated according to tax line items, such as when the report is a tax return. In another alternative, the amounts may be aggregated according to income and expenses. One skilled in the art will appreciate that multiple techniques may be used to generate a report any of which may be used.

After generating the report, the report may be stored and/or presented to the user in accordance with one or more embodiments of the invention (Step 211). Presenting the report to the user may involve displaying the report, creating a printout of the report, sending the report to an address, such as an email account or a physical address.

If the report is an interactive report, the user may select portions of the report in accordance with one or more embodiments of the invention. For example, the report may specify potentially tax deductible expenses, which the user may select. Further, after reviewing the report, the user may decide to modify the report and add business categories to one or more transaction records.

At this stage, a determination is made whether to update the report (Step 213). If a determination is made to update the report, then the user may be prompted to assign business categories to transaction records not already associated with a business category (Step 205).

Alternatively, if the determination is made not to update the report, then the user may complete the review and perform any action using the report as desired. For example, the user may modify their business practices based on data in the report. In another example, if the report is a tax return, then the user may file the tax return.

FIG. 4 shows a flowchart of a method for a user to perform account tracking in accordance with one or more embodiments of the invention. Initially, in one or more embodiments of the invention, the user requests to generate a report for a business entity according to a tag (Step 251). For example, the user may select a menu option to request the generation of a report. Upon receipt of the selection, the financial accounting application may display a dialog box whereby the user may specify parameters for the report, such as the name of the business, the business tag, a timeframe to generate the report, or any other information specified by the user.

When the financial accounting application begins to generate the report, the financial accounting application may prompt the user to assign business categories to the transaction records. Accordingly, the user may view the prompt to assign a business category to a transaction record (Step 253). As discussed above, the prompt may be a dialog box or an alert indicating that at least one transaction record is not assigned to a business category.

The user assigns a business category to the transaction record using the prompt in accordance with one or more embodiments of the invention (Step 255). Specifically, the user may assign a business category to each transaction record tagged with a business tag and not assigned a business category. Alternatively, the user may realize that the transaction record is not associated with a business entity and may change the business tag to a personal tag.

Further, the user reviews the report in accordance with one or more embodiments of the invention (Step 257). Based on the review of the report, the user may adjust their business practices, such as modify the amount of raw goods purchased, adjust their working hours, change locations of the business entity, and close the business entity, or perform other business related actions, such as file a tax return or inform investors of the report.

The user may also make a determination whether to update the report in accordance with one or more embodiments of the invention (Step 259). For example, if the report shows an amount of business expenses which are potentially tax deductible, the user may decide to review transaction records affecting the amount and assign a new business category to one or more the transaction records. In such scenario, the user may select to update the report and view a prompt to assign a business category to a transaction record in accordance with one or more embodiments of the invention (Step 253). Alternatively, the user may continue using or close the financial accounting application in accordance with one or more embodiments of the invention.

Figure 5A:
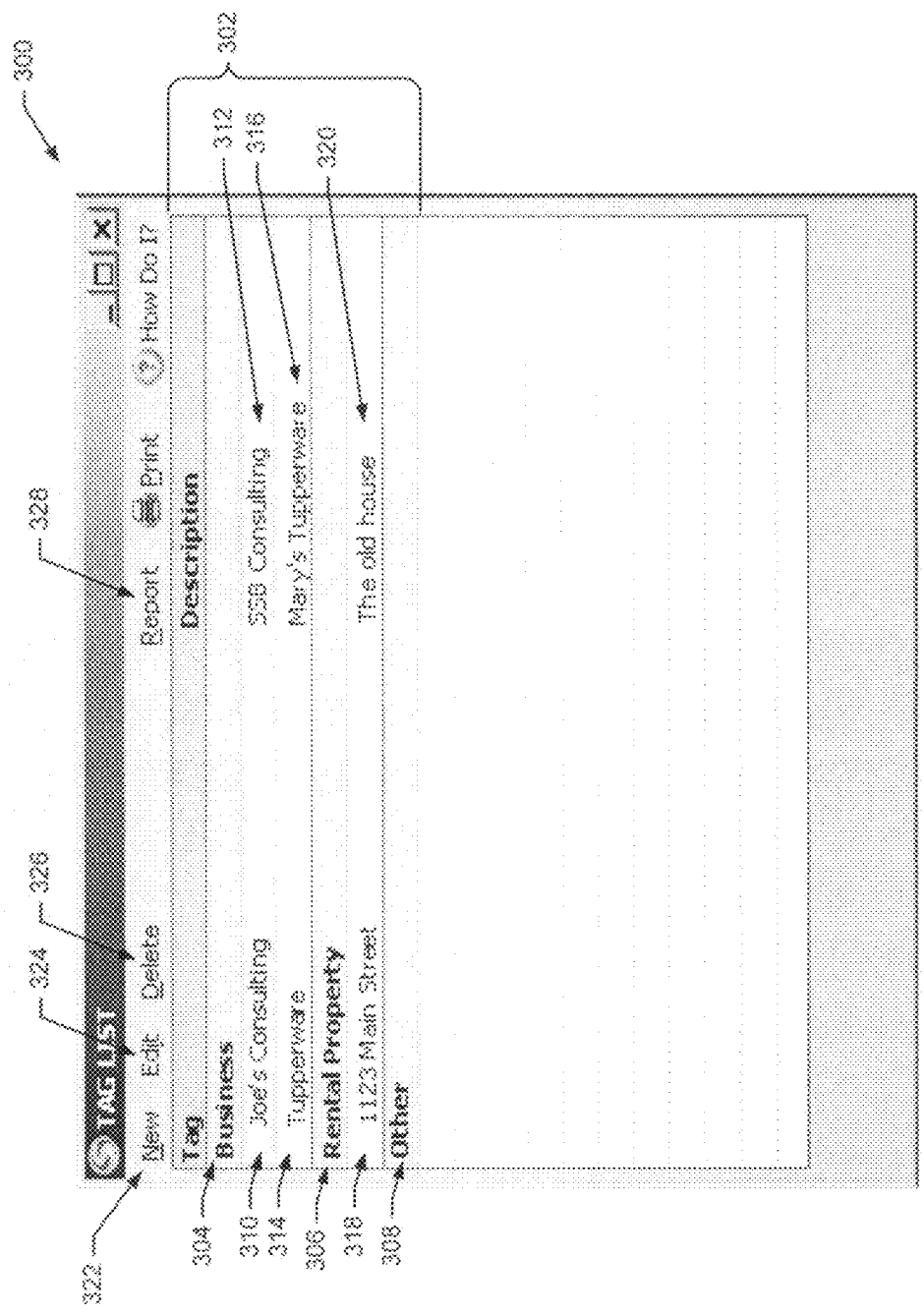
FIGS. 5A-5F show example user interfaces in accordance with one or more embodiments of the invention.

FIGS. 5A-5F show an example user interfaces in accordance with one or more embodiments of the invention. FIG. 5A shows an example user interface (300) for a tag list (302) in accordance with one or more embodiments of the invention. In the example shown in FIG. 5A, the tag list (302) includes business tags (304), rental property tags (306), and other types of tags (308). In alternative embodiments of the invention, the division between the tags may change, for example, rental property tags may be a subset of the business tags. In the example shown in FIG. 5A, each tag in the tag list (300) has a name and a description. For example, the "Joe's Consulting" business tag (310) has the description "SSB consulting" (312). Similarly, the "Tupperware" business tag (314) has a description of "Mary's Tupperware" (316). The "1123 Main Street" tag (318) has the description of "the old house" (320). Using the user interface (300) shown in example FIG. 5B, the user may select menu options to add a new tag (322), edit an existing tag (324), delete a tag (326), and request to generate a report (328) based on a tag. Further, the tags shown in FIG. 5A provide a technique whereby a user may distinguish between personal and business transactions.

Figure 5B:
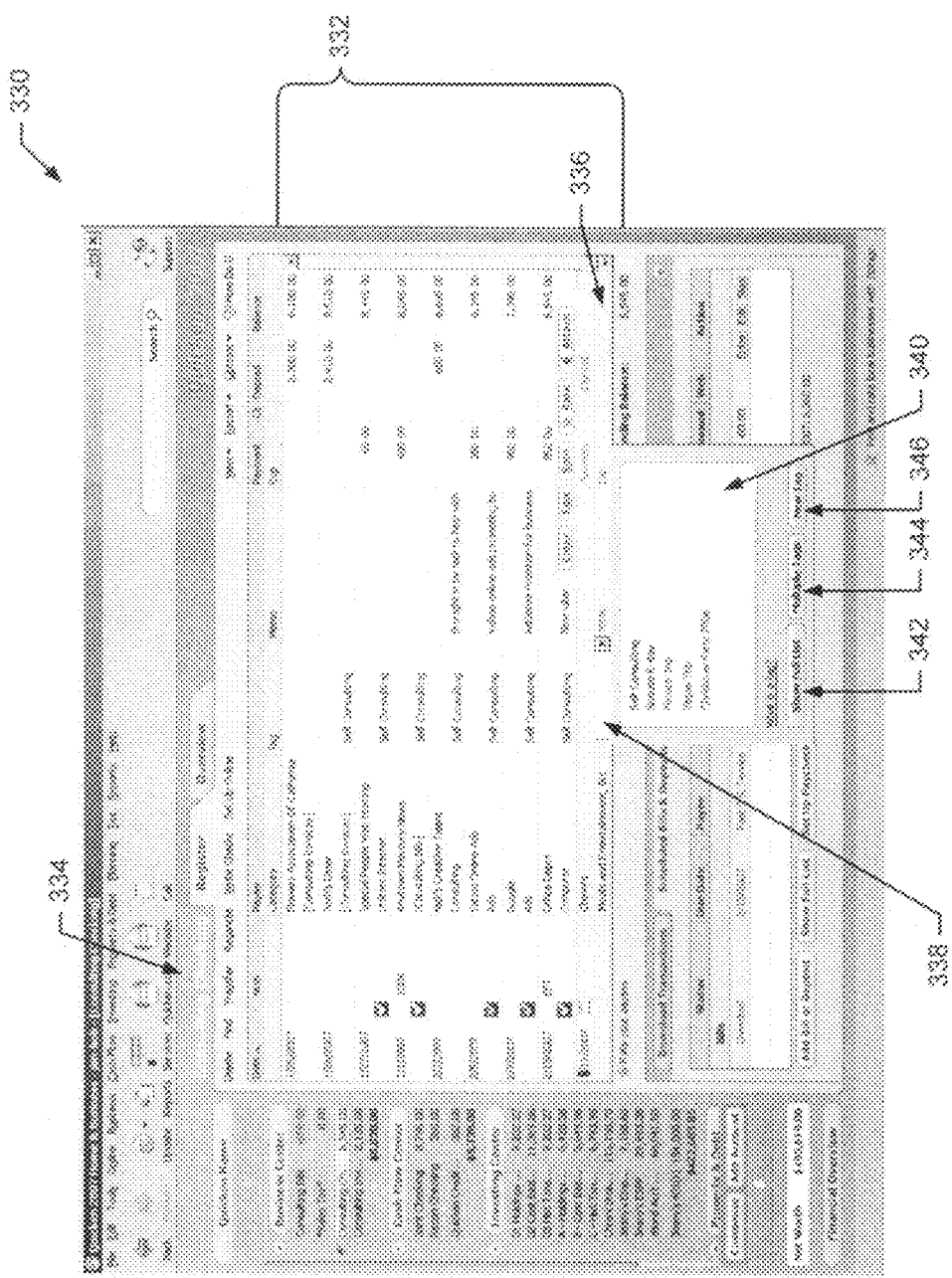

FIG. 5B shows an example user interface (330) for a user to add a tag to a transaction record in accordance with one or more embodiments of the invention. The example user interface (330) shows transaction records (332) for a financial account labeled "Consulting Checking" (334). Specifically, in the example, consider the scenario in which the business is a consulting practice and the user uses the financial account to perform both personal and business transactions. The default tag for the financial account in the example is self-consulting. However, in the example, the user may want to assign a transaction record (336) corresponding to a dinner at "Chevy's" a different tag rather than the default tag. Accordingly, the user may select the tag field (338) to view a drop-down box (340) showing possible tags that may be assigned. Each tag may be for business (e.g., Self-Consulting, Christmas Party 2006) transactions or personal transactions (e.g., Spouse E-Bay, Mexico Trip, Vegas Trip). Using the drop-down box (340), the user may select a tag or select a button to show the full list of tags (342), select multiple tags (344), or create a new tag (346).

Figure 5C:
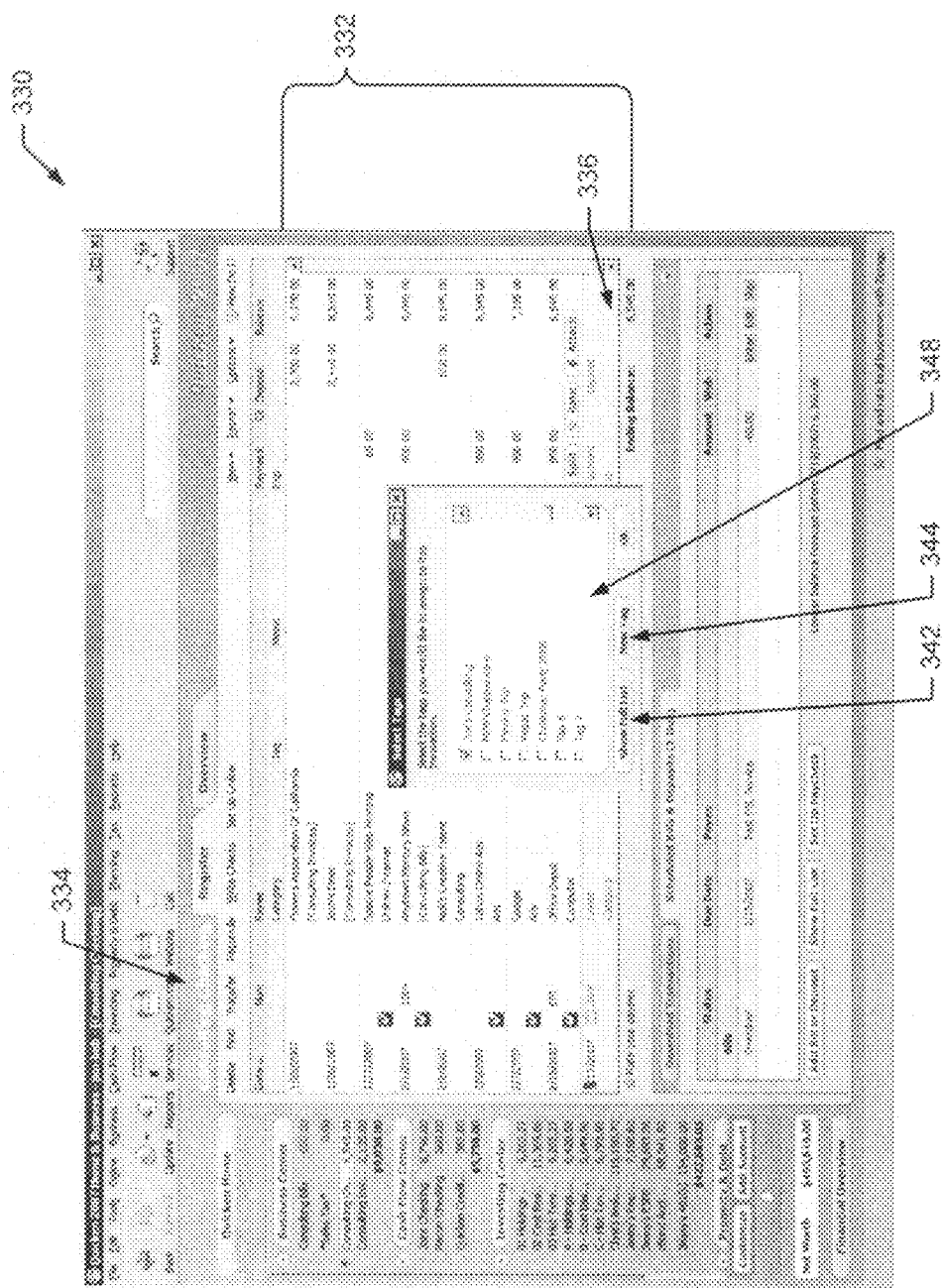

FIG. 5C shows an example user interface (330) for when a user selects to assign multiple tags (344) with the same transaction in accordance with one or more embodiments of the invention. As shown in FIG. 5C, a dialog box (348) is displayed in the example user interface (330). From the dialog box (348), the user may select checkboxes corresponding to the tags the user wants to assign to the transaction record in accordance with one or more embodiments of the invention. The user may also select a button to show the full list of tags (342) or create a new tag (346).

Figure 5D:
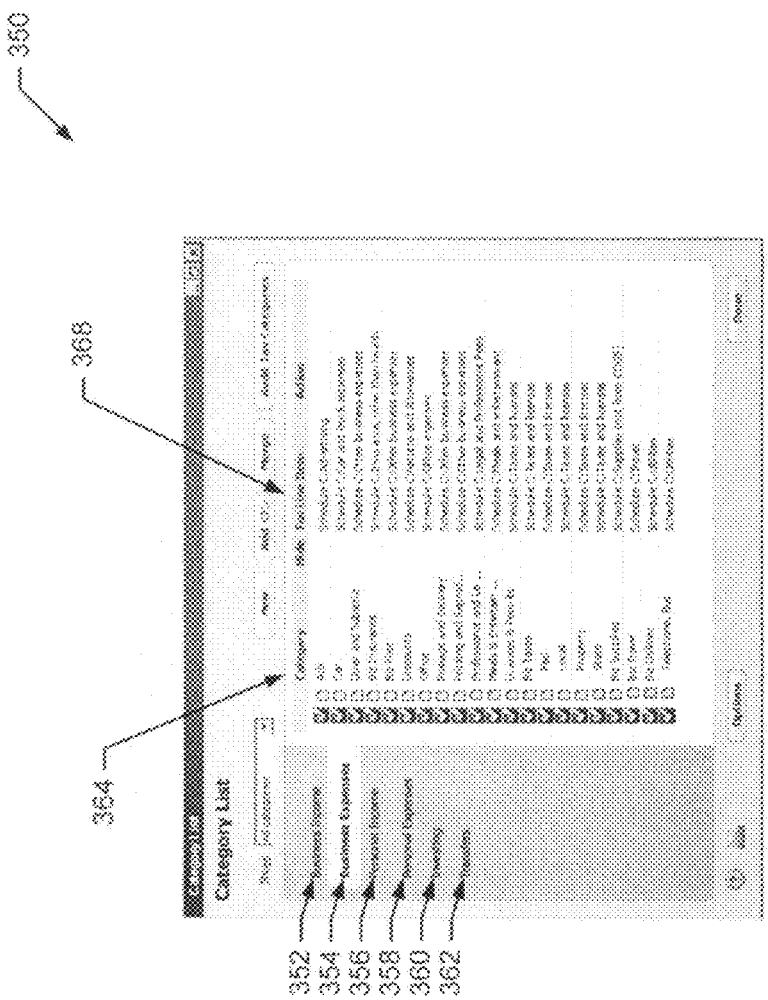

Continuing with the example user interfaces, FIG. 5D shows an example user interface (350) for a user to view and update a list of categories in accordance with one or more embodiments of the invention. In the example user interface (350), the user may select to view and update business income (352), business expenses (354), personal income (356), personal expenses (358), investing (360), and transfers (362). As shown in the example, the category list shows the category and the tax line item affected by the category. Thus, in the example, each business expense (354) category is associated with a tax line item. Accordingly, transaction records assigned to a business expense category have the corresponding tax line item associated with them.

Figure 5E:
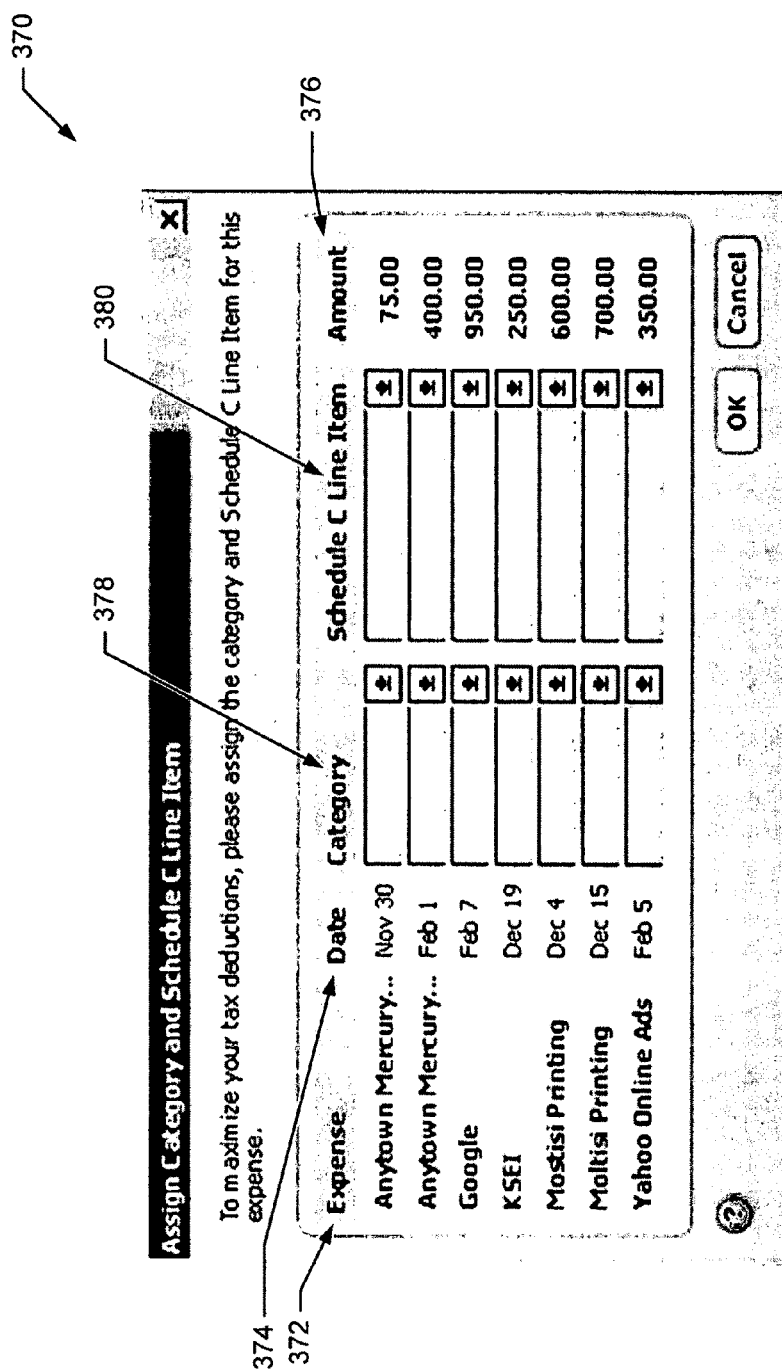

When a transaction record has a business tag that is not assigned a business category, the financial accounting application may identify the transaction record and display a prompt. FIG. 5E shows an example user interface (370) for assigning a business category to a transaction record labeled with a tag associated with a business entity in accordance with one or more embodiments of the invention. In the example, each transaction record in the list may be identified by the payee of the expense (372), the date of the expense (374), and the amount of the expense (376). The user may select drop-down boxes to assign a business category (378) to the transaction record. When the user assigns the business category to the transaction record, the tax line item for the business category may be automatically displayed in another drop-down box (380). Alternatively, the user may select the tax line item from the drop-down box (380) for the tax line item in accordance with one or more embodiments of the invention. The user may view the prompt before or after reviewing a report.

Figure 5F:
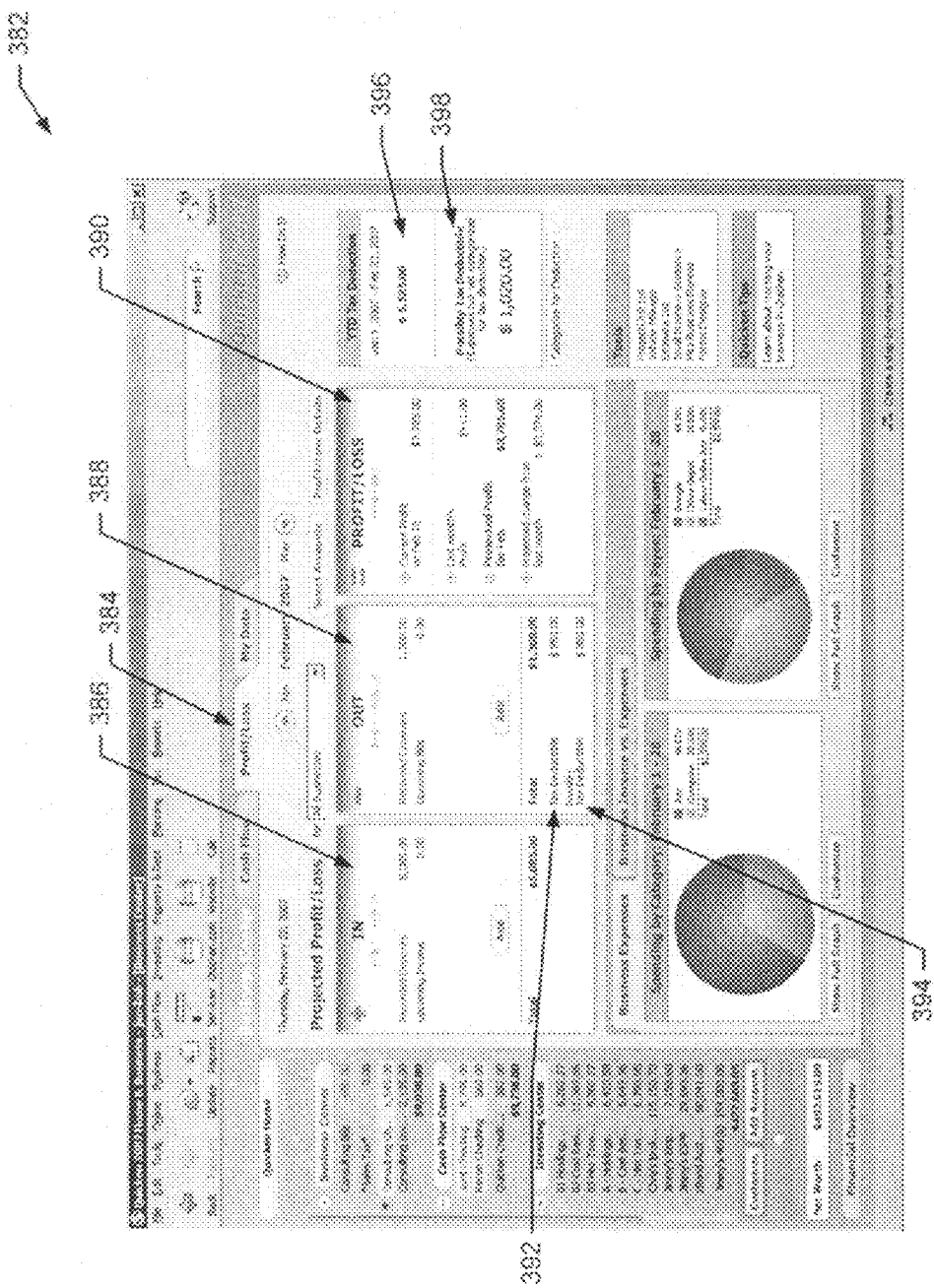

FIG. 5F shows an example user interface (382) for a user to interact with a profit/loss report (384) in accordance with one or more embodiments of the invention. In the example profit/loss report (384), a user may view a report of income (386) for the month of February, expenses for the month of February (388), and a summary for the month of February (390). In the expenses (388), the user may view the total amount for transactions that are tax deductible (392) and the total amount of transaction which are potentially tax deductible (394) for the month of February. Additionally, the user may view information about the year to date, such as the total amount for transactions that are tax deductible (396) and the total amount in transactions which are potentially tax deductible (398) for the year. By selecting the total amount of transactions which are potentially tax deductible for the month of February (394) or for the year (398), the financial accounting application may display the dialog box shown in FIG. 5E. Thus, in the example, the user may assign transaction records associated with a business tag to business categories which are associated with tax deductible line items.

Figure 6:
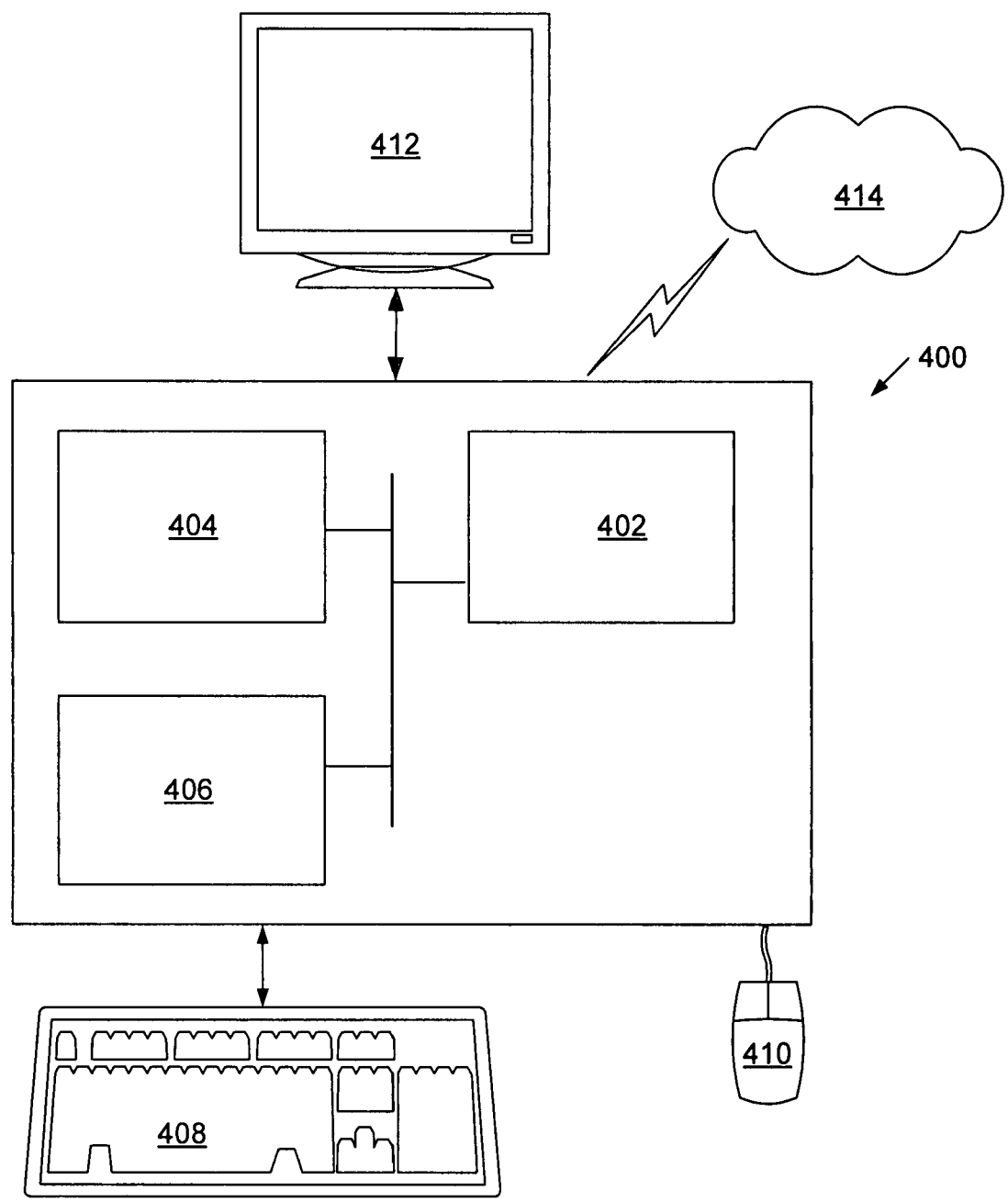
FIG. 6 shows a computer system in accordance with one or more embodiments of the invention.

The invention may be implemented on virtually any type of computer regardless of the platform being used. For example, as shown in FIG. 6, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a local area network (LAN) or a wide area network (e.g., the Internet) (not shown) via a network interface connection (414). Those skilled in the art will appreciate that these input and output means may take other forms.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (e.g., financial accounting application, data repository, financial account, etc.) may be located on a different or the same node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for account tracking comprising:
   obtaining a plurality of transactions records from a financial account, wherein the plurality of transactions records comprises a plurality of personal transaction records and a plurality of business transaction records commingled in the financial account;
   assigning, after obtaining the plurality of transaction records, a business entity specific tag to the plurality of business transaction records using a computer processor;
   receiving a request to generate a first report for a business entity, wherein the request specifies the business entity specific tag associated with the business entity;
   selecting, in response to the request, the plurality of business transaction records from the plurality of transaction records based on the business entity specific tag using the computer processor;
   identifying at least one business transaction record, not associated with at least one of a plurality of business categories, in the plurality of business transaction records;
   calculating a total amount of potentially tax deductible expenses according to the at least one business transaction record;
   displaying, for a user, the total amount of potentially tax deductible expenses in the first report for the business entity;
   receiving a selection from the user of the total amount of potentially tax deductible expenses for assigning one of the plurality of business categories to the at least one business transaction record;
   assigning, based on the selection, a business category from a plurality of business categories to the at least one business transaction record using the computer processor;
   automatically associating the at least one business transaction record with a corresponding tax line item of a plurality of tax line items based on the business category; and
   generating a second report for the business entity by grouping the plurality of business transaction records according to the plurality of business categories.

2. The method of claim 1, wherein financial account is maintained as a personal account.

3. The method of claim 1, wherein grouping the plurality of business transaction records comprises aggregating amounts of the plurality of business transaction records according to the plurality of tax line items.

4. The method of claim 1, further comprising:
   presenting the second report to the user.

5. The method of claim 1, wherein the first report further comprises a total amount of tax deductible expenses using the plurality of business categories.

6. The method of claim 1, comprising:
   prompting the user to assign one of the plurality of business categories to the at least one of the plurality of business transaction records.

7. The method of claim 6, wherein prompting the user to assign one of the plurality of business categories comprises:
   displaying the at least one of the plurality of business transaction records; and
   displaying a field for submitting one of the plurality of business categories to assign to the at least one of the plurality of business transaction records.

8. The method of claim 1, further comprising:
   displaying a list of the plurality of business categories wherein each business category in the list is displayed with an associated tax line item of the plurality of tax line items.

9. A system for account tracking comprising:
   a data repository for maintaining a plurality of transactions records comprising a plurality of personal transaction records and a plurality of business transaction records commingled in a financial account; and
   a financial accounting application configured to:
      assign after obtaining the plurality of transaction records, a business entity specific tag to the plurality of business transaction records;
      receive a request to generate a first report for a business entity, wherein the request specifies the business entity specific tag associated with the business entity;
      select, in response to the request and from the data repository, the plurality of business transaction records from the plurality of transaction records based on the business entity specific tag;
      identify at least one business transaction record, not associated with at least one of a plurality of business categories, in the plurality of business transaction records;
      calculate a total amount of potentially tax deductible expenses according to the at least one business transaction record;
      display, for a user, the total amount of potentially tax deductible expenses in the first report for the business entity;
      receive a selection from the user of the total amount of potentially tax deductible expenses for assigning one of the plurality of business categories to the at least one business transaction record;
assign, based on the selection, a business category from a plurality of business categories to the at least one business transaction record;
automatically associate the at least one business transaction record with a corresponding tax line item of a plurality of tax line items based on the business category; and
generate a second report for the business entity by grouping the plurality of business transaction records according to the plurality of business categories and a computer processor for executing said financial accounting application.

10. The system of claim 9, wherein the financial account is maintained as a personal account.

11. The system of claim 9, wherein grouping the plurality of business transaction records comprises aggregating amounts of the plurality of business transaction records according to the plurality of tax line items.

12. The system of claim 9, wherein the financial accounting application is further configured to:
present the second report to the user.

13. The system of claim 9, wherein the first report further comprises a total amount of tax deductible expenses using the plurality of business categories.

14. The system of claim 9, wherein the financial accounting application is further configured to:
prompt the user to assign one of the plurality of business categories to the at least one of the plurality of business transaction records.

15. The system of claim 14, wherein prompting the user to assign one of the plurality of business category comprises:
displaying the at least one of the plurality of business transaction records; and
displaying a field for submitting one of the plurality of business categories to assign to the at least one of the plurality of business transaction records.

16. The system of claim 9, wherein the financial accounting application is further configured to:
display a list of the plurality of business categories wherein each business category in the list is displayed with an associated tax line item of the plurality of tax line items.

17. A method for account tracking comprising:
commingling, in a financial account, financial transactions associated with a business entity and financial transaction associated with personal expenses to generate a plurality of transactions records comprising a plurality of personal transaction records and a plurality of business transaction records commingled in the financial account;
assigning, using a computer system, a business entity specific tag to the plurality of business transaction records;
requesting to generate a report for a business entity by selecting the business entity specific tag associated with the business entity;
viewing, on the computer system, a report comprising the total amount of potentially tax deductible expenses for the business entity, wherein the total amount of potentially tax deductible expenses is an aggregation of at least one business transaction record, not associated with at least one of a plurality of business categories, in the plurality of business transaction records;
viewing, on the computer system, a prompt to assign a business category from a plurality of business categories to the at least one of the plurality of business transaction records;
assigning the business category to the at least one business transaction record using the prompt, wherein the at least one business transaction record is automatically associated by the computer system with a corresponding tax line item of a plurality of tax line items based on the business category; and
reviewing a revised report, wherein the revised report is generated for the business entity by grouping the plurality of business transaction records according to the plurality of business categories.

18. The method of claim 17, wherein the report shows a total amount of tax deductible expenses using the plurality of business categories.

19. The method of claim 17, wherein the prompt shows the at least one business transaction record and a field for submitting the one of the plurality of business categories to assign to the at least one business transaction record.

20. A non-transitory computer readable medium comprising computer readable program code embodied therein for causing a computer system to perform a method, the method comprising:
obtaining a plurality of transactions records from a financial account, wherein the plurality of transactions records comprises a plurality of personal transaction records and a plurality of business transaction records commingled in the financial account;
assigning, using a computer processor, after obtaining the plurality of transaction records, a business entity specific tag to the plurality of business transaction records;
receiving a request to generate a first report for a business entity, wherein the request specifies the business entity specific tag associated with the business entity;
selecting, in response to the request, using the computer processor, the plurality of business transaction records from the plurality of transaction records based on the business entity specific tag;
identifying at least one business transaction record, not associated with at least one of a plurality of business categories, in the plurality of business transaction records;
calculating a total amount of potentially tax deductible expenses according to the at least one business transaction record;
displaying, for a user, the total amount of potentially tax deductible expenses in the first report for the business entity;
receiving a selection from the user of the total amount of potentially tax deductible expenses for assigning one of the plurality of business categories to the at least one business transaction record;
assigning, based on the selection, a business category from a plurality of business categories to the at least one business transaction record;
automatically associating the at least one business transaction record with a corresponding tax line item of a plurality of tax line items based on the business category; and
generating a second report for the business entity by grouping the plurality of business transaction records according to the plurality of business categories.

21. The non-transitory computer readable medium of claim 20, wherein the method further comprises:
prompting the user to assign one of the plurality of business categories to the at least one of the plurality of business transaction records.

22. The non-transitory computer readable medium of claim 21, wherein prompting the user to assign one of the plurality of business categories comprises:

displaying the at least one of the plurality of business transaction records; and displaying a field for submitting one of the plurality of business categories to assign to the at least one of the plurality of business transaction records.

* * * * *